United States Patent

[11] 3,603,236

| [72] | Inventor | Dieter Engelsmann<br>Unterhaching near Munich, Germany |
|---|---|---|
| [21] | Appl. No. | 846,544 |
| [22] | Filed | July 31, 1969 |
| [45] | Patented | Sept. 7, 1971 |
| [73] | Assignee | AGFA-Gevaert Aktiengesellschaft<br>Leverkusen, Germany |
| [32] | Priority | Aug. 28, 1968 |
| [33] | | Germany |
| [31] | | P 17 97 196.9 |

[54] FILM METERING AND SHUTTER COCKING DEVICE
10 Claims, 1 Drawing Fig.

[52] U.S. Cl. .................................................. 95/31 FM,
95/31 AC, 95/31 FL
[51] Int. Cl. ...................................................... G03b 1/62,
G03b 9/68, G03b 17/42
[50] Field of Search ............................................ 95/31 F, 31;
242/71.2, 71.4

[56] References Cited
UNITED STATES PATENTS

| 3,148,605 | 9/1964 | Peterson et al. ............... | 95/31 |
| 3,232,196 | 2/1966 | Sapp et al. .................... | 95/31 |
| 3,416,425 | 12/1968 | Rigolini ........................ | 95/31 FSL |

*Primary Examiner*—Samuel S. Matthews
*Assistant Examiner*—Russell E. Adams, Jr.
*Attorney*—Michael S. Striker ABSTRACT: A still camera wherein a pivotable detector scans the moving film and enters a perforation to stress a spring during further transport of the film. The thus cocked detector releases a blocking slide which then prevents further transport of the film and permits actuation of a camera release which in turn permits the detector to leave its cocked position and to thereby open the shutter. The detector is mounted on a control lever which is pivotable by the camera release to thereby disengage the detector from the film. The blocking slide is reset by the detector during opening of the shutter.

PATENTED SEP 7 1971
3,603,236
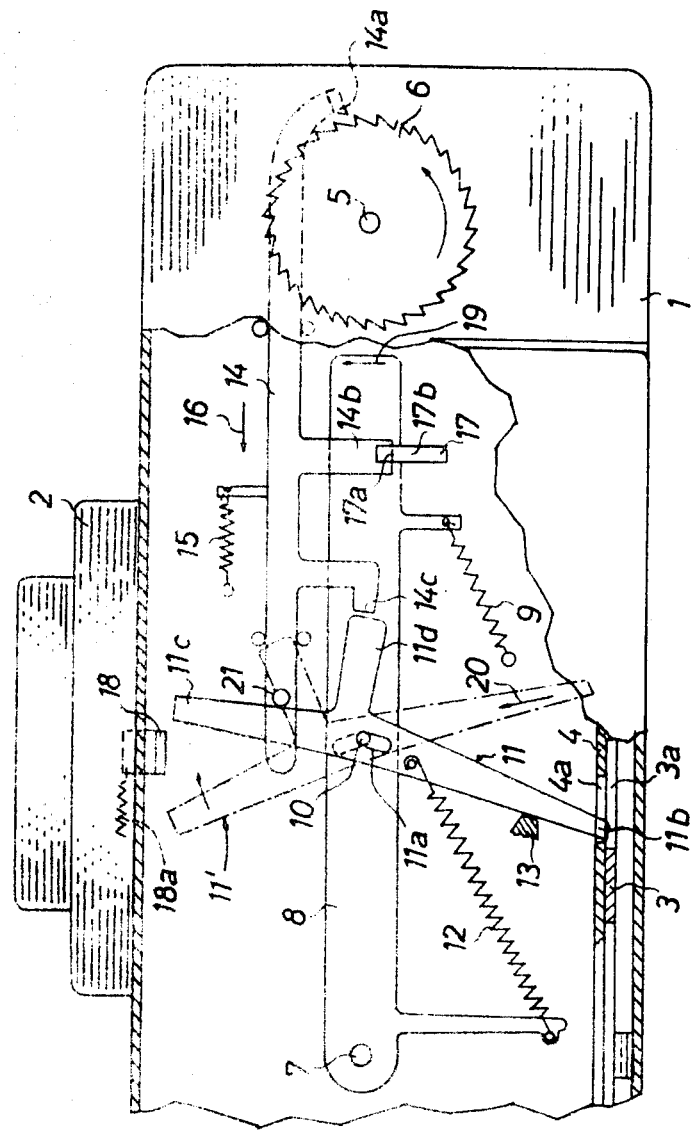
INVENTOR.
DIETER ENGELSMANN
BY
Michael S. Striker
Attorney

FILM METERING AND SHUTTER COCKING DEVICE

BACKGROUND OF THE INVENTION

The present invention relates to photographic apparatus in general, and more particularly to improvements in cameras which are provided with means for preventing double exposure of film frames.

SUMMARY OF THE INVENTION

It is an object of the invention to provide a novel and improved photographic apparatus wherein the blocking device which prevents double exposure of film frames is of simple and compact construction and wherein the device which regulates the operation of the blocking device can perform other important functions, particularly the function of actuating the shutter.

Another object of the invention is to provide a photographic apparatus wherein the device which regulates the operation of the blocking device derives motion from the film.

A further object of the invention is to provide a photographic apparatus wherein the blocking device is automatically reset in response to making of an exposure.

The invention is embodied in a combination of elements in a photographic apparatus of the type wherein the housing accommodates a takeup device which is rotatable to transport the film and wherein the film is provided with a row of perforations. The combination comprises blocking means which is movable (e.g., reciprocable) between a first position in which it prevents rotation of the takeup device and a second position in which it preferably prevents actuation of a camera release, detector means which preferably comprises a lever and has a scanning portion operative to track the film during transport and to enter a perforation to thereby effect movement of the detector means to a cocked position and a second portion which is operative to effect movement of the blocking means to the first position in cocked position of the detector means, and shutter means movable from a closed to an open position in response to movement of the detector means from cocked position. The aforementioned camera release is actuatable (e.g., by hand) to effect movement of the detector means from cocked position when the blocking means prevents rotation of the takeup device.

An advantage of the just described combination is that the detector means not only serves as a device for regulating the movements of the blocking means but also as a device for actuating the shutter means. Another advantage of the combination is that the blocking means prevents actuation of the camera release when the takeup device is free to transport the film.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a fragmentary partial plan and partial horizontal sectional view of a still camera which embodies the invention.

DESCRIPTION OF THE PREFERRED EMBODIMENTS

The drawing shows a portion of a photographic still camera which comprises a housing or body 1 whose front wall carries an objective lens mount 2. A platelike film guide 3 having an opening 3a is provided in front of the rear wall of the housing 1 behind the lens mount 2. The photographic rollfilm 4 is stored in a supply cartridge (not shown) and is transported stepwise in a direction to the right, as viewed in the drawing, to be collected in a takeup cartridge having a shaft 5. The film 4 is provided with a row of perforations 4a, one for each film frame. The takeup cartridge further comprises a ratchet wheel 6 which is rotated by the shaft 5. During transport of the film 4, the wheel 6 rotates in a counterclockwise direction as indicated by the arrow.

The housing 1 accommodates a fixed pivot 7 for a control lever 8 which is biased by a helical spring 9 so that it tends to turn in a clockwise direction. A shaft 10 on the control lever 8 extends into an elongated slot 11a provided in a three-armed detector 11 which is biased by a helical spring 12 reacting against the control lever 8 and tending to turn the detector 11 in a clockwise direction away from a cocked position 11' which is indicated by phantom lines. The spring 12 tends to maintain the film scanning arm 11b of the detector 11 in abutment with a fixed stop 13 in the housing 1. The detector 11 further comprises two additional arms 11c, 11d. The arm 11c serves to move the shutter from closed position and can cooperate with a motion receiving post 21 provided on a reciprocable blocking slide 14. The arm 11d cooperates with an arm or extension 14c of the blocking slide 14 when the detector 11 dwells in the uncocked position. The blocking slide 14 further comprises a pawl 14a which can terminate rotation of the wheel 6, and an arm 14b which can prevent actuation of the camera release 17. The blocking slide 14 extends in substantial parallelism with the film guide 3 and is biased by a helical spring 15 which tends to move it in the direction indicated by arrow 16. The arm 14b extends at right angles to the direction of movement of the blocking slide 14.

The shutter comprises a lever 18 which carries a shutter blade (not shown) and is biased by a spring 18a which tends to maintain the shutter blade in closed position.

The slot 11a permits the detector 11 to perform limited translatory movements with reference to the control lever 8. The drawing shows the blocking slide 14 in that (second) position in which the pawl 14a cannot prevent rotation of the takeup cartridge and in which the arm 14b prevents actuation of the camera release 17.

THE OPERATION

The user transports the film by rotating the shaft 5 in a counterclockwise direction through the intermediary of a wheel, knob, lever or the like, not shown. The arm 11b of the detector 11 bears against the front side of the advancing film 4 and stresses the spring 12 which permits the slot 11a to move upwardly, as viewed in the drawing, so that the shaft 10 is received in the lower part of this slot. When the next-following perforation 4a of the film 4 reached the tip of the arm 11b, the latter enters such perforation and the opening 3a of the guide 3 whereupon the detector 11 begins to turn on the shaft 10 in a counterclockwise direction to move the arm 11b away from the fixed stop 13. During the initial stage of counterclockwise pivotal movement of the detector 11, the arm 11d continues to remain in front of the extension 14c so that the spring 15 cannot contract and the blocking slide 14 cannot move in the direction indicated by arrow 16. The arm 14 b of the blocking slide 14 extends into a notch 17a of the camera release 17 so that the latter cannot be depressed during transport of the film 4 by the length of a frame. The arm 11d holds the blocking slide 14 in such (right-hand end) position that the pawl 14a is held away from engagement with the teeth of the ratchet wheel 6. Consequently, the pawl 14a cannot interfere with rotation of the shaft 5 in a direction to draw film 4 from the supply cartridge.

When the film 4 is transported by the length of a frame, the detector 11 assumes the phantom line cocked position 11' and moves its arm 11d away from registry with the extension 14c of the blocking slide 14. The arm 11c is moved to the left of the lever 18. The spring 15 is free to contract and to move pawl 14a into engagement with the ratchet wheel 6 to prevent further counterclockwise rotation of the shaft 5. The arm 14b moves away from the notch 17a so that the user of the camera can make an exposure by depressing the release 17. During such depression, a cam face 17b of the release 17 moves with reference to the control lever 8 and pivots the latter in a counterclcokwise direction (arrow 19) to stress the spring 9. The shaft 10 moves the detector 11 in the direction indicated by arrow 20 to stress the spring 12. Such movement of the detector 11 results in withdrawal of the arm 11b from the adjacent perforation 4a whereby the spring 12 is free to contract and to propel the arm 11c in a clockwise direction to impact against the lever 18 and to open the shutter against the opposition of the spring 18a. The detector 11 comes to a halt when its arm 11b engages the stop 13. During clockwise rotation of the detector 11 from the phantom line cocked position 11' to the solid line uncocked position, the arm 11c moves past the pivoted lever 18 so that the latter can return to its closed position under the action of the spring 18a. The arm 11c also engages the post 21 on the blocking slide 14 and returns the slide to the illustrated position in which the pawl 14a is disengaged from the ratchet wheel 6 so that the operator is free to again transport the film 4 by the length of a frame. When the operator removes his finger from the release 17, the latter returns to the illustrated position and the arm 14b reenters the notch 17a to prevent renewed depression of the release 17 prior to transport of the film 4 by the length of a frame. The spring 9 turns the control lever 8 in a clockwise direction (counter to that indicated by the arrow 19) whereby the detector 11 shares such movement and its arm 11b bears against the front side of the film 4 to enter the next perforation 4a when the operator rotates the shaft 5 in a counterclockwise direction.

An important advantage of the improved camera is that the double exposure preventing or blocking means is very simple and compact and that the detector 11 not only serves as a means for scanning the perforations 4a but also as an impeller which actuates the shutter in automatic response to depression of the camera release 17. Another advantage of the camera is that the blocking slide 14 performs two functions, namely, its pawl 14a can block further transport of the film when the arm 14b permits actuation of the release 17, and vice versa, and that the blocking slide 14 is controlled by the detector 11.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims.

1. In a photographic apparatus wherein the housing accommodates a takeup device which is rotatable to transport the film and wherein the film is provided with a row of perforations, a combination comprising blocking means movable between a first position in which it prevents rotation of the takeup device and a second position; detector means having a scanning portion operative to track the film during transport and to enter a perforation to thereby effect movement of said detector means to a cocked position, and a second portion operative to effect movement of said blocking means to said first position in the cocked position of said detector means; release means actuatable to move from a first to a second position and to thereby effect movement of said detector means from cocked position; and shutter means movable from a closed to an open position, said detector means being arranged to move said shutter means to open position in response to movement of said detector means from cocked position.

2. A combination as defined in claim 1, wherein said blocking means comprises a portion which extends into the path of movement of said release means from the first to the second position of said release means in the second position of said blocking means and thus prevents actuation of said release means in the second position of said blocking means.

3. In a photographic apparatus wherein the housing accommodates a takeup device which is rotatable to transport the film and wherein the film is provided with a row of perforations, a combination comprising blocking means movable between a first position in which it prevents rotation of the takeup device and a second position; detector means having a scanning portion operative to track the film during transport and to enter a perforation to thereby effect movement of said detector means to a cocked position, and a second portion operative to effect movement of said blocking means to said first position in the cocked position of said detector means; release means actuatable to effect movement of said detector means from said cocked position; shutter means movable from a closed to an open position in response to movement of said detector means from said cocked position; control means pivotable about a first axis and defining a second axis for pivotal movement of said detector means to and from said cocked position; and means for biasing said detector means from said cocked position.

4. A combination as defined in claim 3, further comprising means for connecting said detector means to said control means with limited freedom of translatory movement of said detector means with reference to said control means.

5. A combination as defined in claim 3, wherein the second portion of said detector means holds said blocking means against movement from second to first position in uncocked position of said detector means.

6. A combination as defined in claim 5, wherein said detector means further comprises a third portion which moves said shutter means to open position in response to movement of said detector means from cocked position.

7. A combination as defined in claim 3, wherein said release means comprises means for pivoting said control means to thereby withdraw said scanning portion from a perforation of the film in cocked position of said detector means.

8. A combination as defined in claim 1, wherein said blocking means is reciprocable between said first and second positions and further comprising spring means for biasing said blocking means to said first position, said blocking means comprising a first portion which engages the takeup device in the first position of said blocking means, a second portion which prevents actuation of said release means in the second position of said blocking means, and a third portion which cooperates with the second portion of said detector means to hold said blocking means in said second position in uncocked position of said detector means.

9. A combination as defined in claim 8, wherein the takeup device comprises a ratchet wheel and wherein the first portion of said blocking means comprises a pawl which engages said ratchet wheel in the first position of said blocking means.

10. A combination as defined in claim 8, wherein said blocking means further comprises a fourth portion which is engaged by said detector means during movement from cocked position to effect movement of said blocking means to second position and to thereby stress said spring means.